United States Patent
Gohl et al.

(10) Patent No.: US 9,896,205 B1
(45) Date of Patent: Feb. 20, 2018

(54) UNMANNED AERIAL VEHICLE WITH PARALLAX DISPARITY DETECTION OFFSET FROM HORIZONTAL

(71) Applicant: GOPRO, INC., San Mateo, CA (US)

(72) Inventors: Pascal Gohl, Zurich (CH); Sammy Omari, Winterhur (CH)

(73) Assignee: GoPro, Inc., San Mateo, CA (US)

( * ) Notice: Subject to any disclaimer, the term of this patent is extended or adjusted under 35 U.S.C. 154(b) by 258 days.

(21) Appl. No.: 14/949,798

(22) Filed: Nov. 23, 2015

(51) Int. Cl.

| | |
|---|---|
| B64C 19/00 | (2006.01) |
| G01C 3/00 | (2006.01) |
| G06T 7/00 | (2017.01) |
| H04N 5/00 | (2011.01) |
| B64C 39/02 | (2006.01) |
| G01C 3/08 | (2006.01) |
| H04N 5/247 | (2006.01) |
| H04N 5/225 | (2006.01) |

(52) U.S. Cl.
CPC ............ B64C 39/024 (2013.01); B64C 19/00 (2013.01); G01C 3/085 (2013.01); G06T 7/0018 (2013.01); G06T 7/0065 (2013.01); H04N 5/2252 (2013.01); H04N 5/247 (2013.01); *B64C 2201/14* (2013.01); *G06T 2207/10032* (2013.01)

(58) Field of Classification Search
CPC ....... B64C 19/00; B64C 39/024; B64C 27/08; B64C 2201/024; B64C 2201/123; B64C 2201/027; B64C 2201/141; G01C 3/085; G01C 15/002; G06T 7/0018; G06T 7/0065; G06T 2207/10032; G06T 2207/30261; H04N 5/2252; H04N 5/247; G02B 2027/0138; G02B 2027/014; G02B 2027/0178; G02B 27/0093; G02C 9/00; G05D 1/0033; G05D 1/101; G05D 1/0088
USPC ......................................................... 701/3–5
See application file for complete search history.

(56) References Cited

U.S. PATENT DOCUMENTS

| | | | |
|---|---|---|---|
| 3,180,205 A * | 4/1965 | Pickholtz | G01C 3/10 244/180 |
| 6,141,034 A | 10/2000 | McCutchen | |
| 9,158,304 B2 | 10/2015 | Fleck | |
| 9,409,646 B2 | 8/2016 | Fleck | |
| 9,442,485 B1 | 9/2016 | McDermott | |
| 2002/0180759 A1 | 12/2002 | Park | |
| 2005/0062869 A1 | 3/2005 | Zimmermann | |
| 2009/0251530 A1 | 10/2009 | Cilia | |
| 2010/0250022 A1 | 9/2010 | Hines | |
| 2012/0154785 A1 | 6/2012 | Gilliland | |
| 2013/0166103 A1 | 6/2013 | Ko | |
| 2014/0036064 A1 | 2/2014 | Yuesheng Lu | |
| 2014/0132804 A1 | 5/2014 | Guissin | |
| 2014/0192144 A1 | 7/2014 | St. Clair | |
| 2014/0240464 A1 | 8/2014 | Lee | |
| 2014/0267596 A1 | 9/2014 | Geerds | |
| 2014/0362176 A1 | 12/2014 | St. Clair | |
| 2015/0057917 A1 | 2/2015 | Cheng | |

(Continued)

*Primary Examiner* — Nga X Nguyen
(74) *Attorney, Agent, or Firm* — Sheppard Mullin Richter & Hampton LLP

(57) ABSTRACT

This disclosure relates to unmanned aerial vehicles with parallax disparity detection offset from horizontal. The unmanned aerial vehicles use two optical elements, which are arranged to be separated by a horizontal distance and a vertical distance when the unmanned aerial vehicles operate leveled with respect to ground, to determine parallax disparity of an object.

20 Claims, 3 Drawing Sheets

(56) References Cited

U.S. PATENT DOCUMENTS

| | | |
|---|---|---|
| 2015/0071524 A1 | 3/2015 | Lee |
| 2015/0134143 A1 | 5/2015 | Willenborg |
| 2015/0142211 A1 | 5/2015 | Shehata |
| 2015/0160658 A1* | 6/2015 | Reedman .............. G05D 1/102 701/3 |
| 2015/0166476 A1 | 6/2015 | Chen |
| 2015/0205301 A1 | 7/2015 | Gilmore |
| 2015/0304532 A1 | 10/2015 | Bart |
| 2015/0336015 A1 | 11/2015 | Blum |
| 2015/0350614 A1 | 12/2015 | Meier |
| 2015/0363648 A1 | 12/2015 | Li |
| 2015/0367958 A1 | 12/2015 | Lapstun |
| 2015/0370250 A1 | 12/2015 | Bachrach |
| 2016/0018822 A1 | 1/2016 | Nevdahs |
| 2016/0031559 A1 | 2/2016 | Zang |
| 2016/0037068 A1 | 2/2016 | Jenny |
| 2016/0054737 A1 | 2/2016 | Soll |
| 2016/0076892 A1 | 3/2016 | Zhou |
| 2016/0101856 A1 | 4/2016 | Kohstall |
| 2016/0105609 A1 | 4/2016 | Pettegrew |
| 2016/0129999 A1 | 5/2016 | Mays |
| 2016/0139596 A1 | 5/2016 | Na |
| 2016/0139602 A1 | 5/2016 | Kohstall |
| 2016/0179096 A1 | 6/2016 | Bradlow |
| 2016/0189101 A1 | 6/2016 | Kantor |
| 2016/0259330 A1 | 9/2016 | Lacaze |
| 2016/0274338 A1 | 9/2016 | Davies |
| 2016/0286119 A1 | 9/2016 | Rondinelli |
| 2016/0295108 A1 | 10/2016 | Cao |
| 2016/0304198 A1 | 10/2016 | Jourdan |
| 2016/0306351 A1 | 10/2016 | Fisher |
| 2016/0327950 A1 | 11/2016 | Bachrach |
| 2016/0336020 A1 | 11/2016 | Bradlow |
| 2016/0344981 A1 | 11/2016 | Lunt |
| 2016/0349599 A1 | 12/2016 | Macmillan |
| 2016/0360104 A1 | 12/2016 | Zhang |
| 2016/0376004 A1 | 12/2016 | Claridge |
| 2017/0006340 A1 | 1/2017 | Enke |
| 2017/0041553 A1* | 2/2017 | Cao ..................... G06T 5/50 |
| 2017/0097645 A1 | 4/2017 | Garland |
| 2017/0102715 A1 | 4/2017 | Shi |
| 2017/0108877 A1 | 4/2017 | Zang |
| 2017/0123425 A1 | 5/2017 | Zhao |
| 2017/0227162 A1 | 8/2017 | Saika |

* cited by examiner

UNMANNED AERIAL VEHICLE WITH PARALLAX DISPARITY DETECTION OFFSET FROM HORIZONTAL

FIELD OF THE INVENTION

The invention relates to unmanned aerial vehicles with parallax disparity detection offset from horizontal.

BACKGROUND OF THE INVENTION

It is known that unmanned aerial vehicles, or UAVs, may be equipped with optical elements that guide light to image sensors, and that images of an object captured by the image sensors may be used to determine parallax disparity of the object. In such UAVs, the optical elements are arranged so that they are level/horizontal, like human eyes, when the UAVs operate leveled with respect to ground, e.g., not producing horizontal thrust.

SUMMARY

One aspect of the invention relates to unmanned aerial vehicles with parallax disparity detection offset from horizontal. The unmanned aerial vehicles with parallax disparity detection offset from horizontal is provided by arranging optical elements so that they are separated by both a horizontal distance and a vertical distance when the UAVs operate leveled with respect to ground, e.g. not producing horizontal thrust.

A UAV with parallax disparity detection offset from horizontal may include one or more of a housing, a motor, a first optical element, a first image sensor, a second optical element, a second sensor, a processor, and/or other components. The motor may be carried by the housing and may be configured to drive a rotor. The rotor may provide thrust to move the UAV in any direction. The first optical element may be configured to guide light to the first image sensor, and the second optical element may be configured to guide light to the second image sensor. The first optical element and the second optical element may receive light from an object. The first image sensor may be configured to generate a first output signal conveying first visual information regarding the object, and the second image sensor may be configured to generate a second output signal conveying second visual information regarding the object. The visual information may include, by way of non-limiting example, one or more of an image, a video, and/or other visual information. The first optical element, the second optical element, the first image sensor and the second image sensor may be attached to the housing.

The first image sensor may include, by way of non-limiting example, one or more of charge-coupled device sensor, active pixel sensor, complementary metal-oxide semiconductor sensor, N-type metal-oxide-semiconductor sensor, and/or other image sensor. The second image sensor may include, by way of non-limiting example, one or more of charge-coupled device sensor, active pixel sensor, complementary metal-oxide semiconductor sensor, N-type metal-oxide-semiconductor sensor, and/or other image sensor.

The first optical element may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. The second optical element may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

The first optical element and the second optical element may be arranged to be separated by both a horizontal distance and a vertical distance when the UAV operates leveled with respect to ground, e.g. no horizontal thrust is being generated by the rotor. In some implementations, the UAV may be climbing vertically without horizontal movement when the UAV operates leveled with respect to ground. In some implementations, the UAV may be descending vertically without horizontal movement when the UAV operates leveled with respect to ground. In some implementations, the UAV may not be tilting sideways when the UAV operates leveled with respect to ground.

The processor may be attached to the housing and may be configured to provide flight control for the UAV. Flight control may include stabilization control, navigation control, altitude control, propulsion control, engine control, and/or other functions needed and/or used during operation of a UAV. The processor may be configured to receive the first output signal and the second output signal, and may be configured to compare the first visual information with the second visual information to determine parallax disparity of the object. In some implementations, the processor may be configured to determine distance between the object and the UAV based on the parallax disparity.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

An unmanned aerial vehicle may be referred to as UAV. The term "unmanned" refers to the capability of the aerial vehicle to operate without requiring a human operator during a flight. In other words, at least some portion of the flight control may be provided remotely and/or by an autopilot. In some implementations, a UAV may carry passengers, cargo, sensors, and/or other physical objects. In some implementations, a UAV may operate autonomously. Alternatively, and/or simultaneously, in some implementations, at least some functionality of a UAV may be controlled and/or modified through remote control, e.g. by a person, for at least some portion of a flight. For example, a human may control and/or assist remotely in a particular maneuver, such as a take-off or landing.

A UAV may be a fixed wing aircraft, a helicopter, a multi-rotor aircraft (e.g. a quadcopter), a rotary wing aircraft, and/or another type of aircraft. In some implementations, a UAV may combine features of multiple types of aircraft. A UAV may include one or more components configured to provide thrust. By way of non-limiting example, the one or more components providing thrust may include one or more wings, airfoils, motors, propellers, rotors, rotor discs, and/or other components.

Figure 1A:
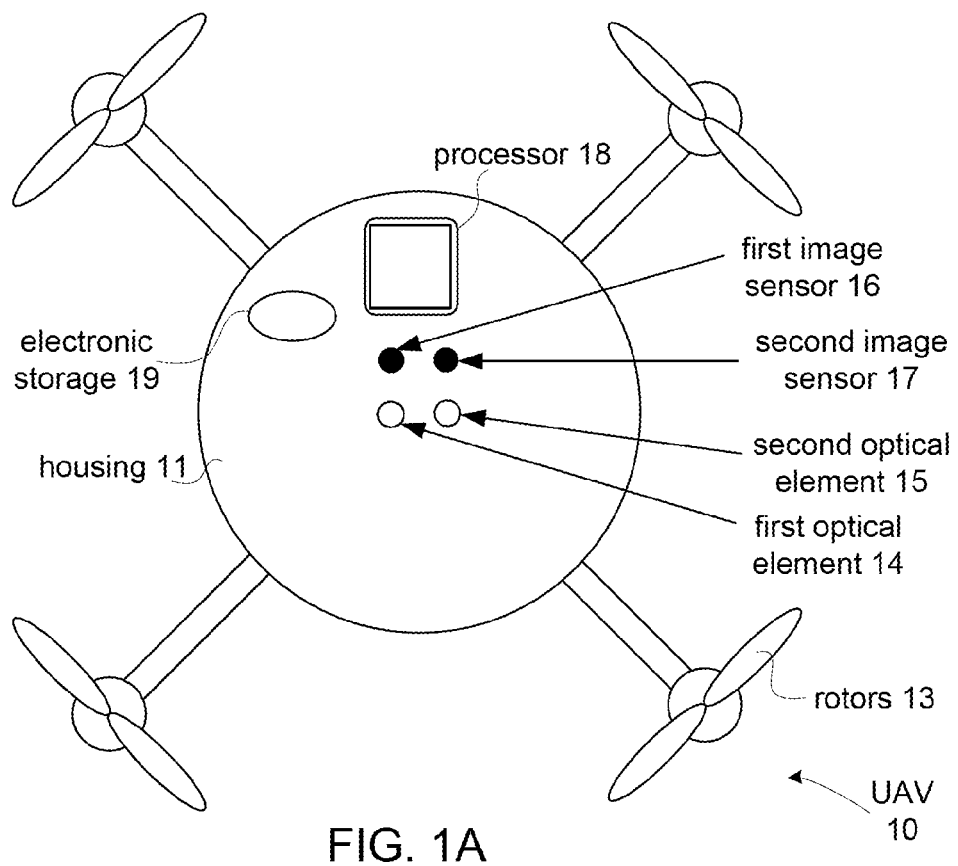
FIG. 1A schematically illustrates an unmanned aerial vehicle in accordance with one or more implementations.
Figure 1B:
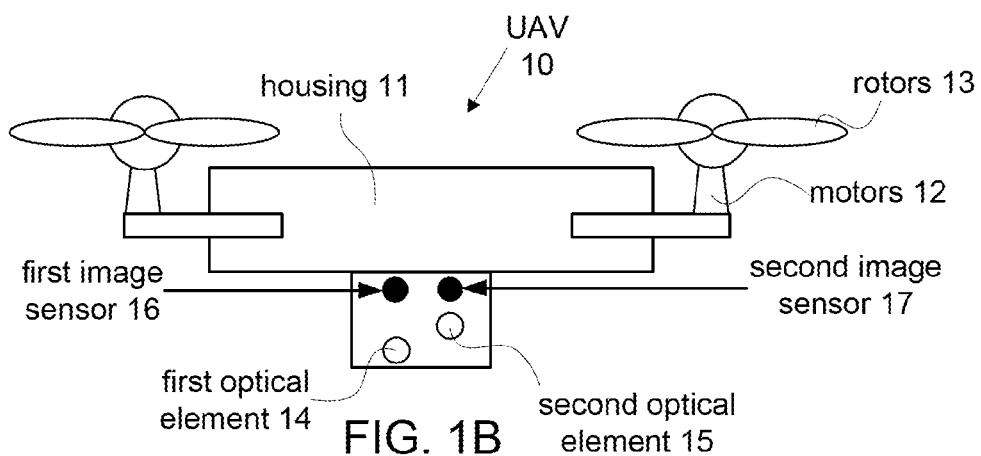
FIG. 1B schematically illustrates an unmanned aerial vehicle in accordance with one or more implementations.

FIGS. 1A and 1B schematically illustrate an unmanned aerial vehicle 10 (also referred to as UAV 10), in particular a quadcopter. The quadcopter is an exemplary and non-limiting implementation of UAV 10. As illustrated in FIGS. 1A and 1B, UAV 10 may include four motors 12 and four rotors 13. The number of motors and rotors of UAV 10 is not intended to be limited by any depiction. In some implementations, UAV 10 may include one, two, three, four, five, six, and/or more than six motors and/or rotors. UAV 10 may include one or more of a housing 11, a motor 12, a rotor 13, a first optical element 14, a second optical element 15, a first image sensor 16, a second image sensor 17, a processor 18, an electronic storage 19, and/or other components.

Housing 11 may be configured to attach to, support, hold, and/or carry components of UAV 10. The combination of housing 11 and components attached to, supported, held, and/or carried by housing 11 may be referred to as an unmanned aerial vehicle.

Rotor 13 may be driven by motor 12. In some implementations, rotor 13 may include a rotor blade, a hub, and a mast. The rotor blade may be connected to the hub, the hub may be connected to the mast, and the mast may be connected to motor 12. In some implementations, rotor 13 may include a rotor blade and a hub. The rotor blade may be connected to the hub, and the hub may be connected to motor 12.

Rotor 13 may provide thrust to move UAV 10 along any direction. In a three-dimensional Cartesian coordinate system, rotor 13 may provide thrust to move UAV 10 along the positive X-axis, the negative X-axis, the positive Y-axis, the negative Y-axis, the positive Z-axis, the negative Z-axis, and any combination thereof. Rotor 13 may provide thrust to rotate UAV 10 along pitch axis, roll axis, yaw axis, and any combination thereof. Rotor 13 may provide thrust to rotate and move UAV 10 at the same time.

First optical element 14 may be configured to guide light to first image sensor 16. Second optical element 15 may be configured to guide light to second image sensor 17. First optical element 14 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. Second optical element 15 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

First optical element 14 may guide light received from an object to first image sensor 16 directly, or indirectly through use of one or more light manipulating components. Second optical element 15 may guide light received from an object to second image sensor 17 directly, or indirectly through use of one or more light manipulating components. By way of non-limiting example, a light manipulating components may include one or more of a mirror, a prism, lenses, and/or other light manipulating components. Although first optical element 14 and second optical element 15 are depicted in FIG. 1 by individual features, one or both of first optical element 14 and/or second optical element 15 may include multiple actual components or pieces.

First image sensor 16 may be configured to generate a first output signal conveying first visual information present in the light guided thereto by first optical element 14. While the object is within a field of view of first optical element 14, first visual information includes the object. Second image sensor 17 may be configured to generate a second output signal conveying second visual information present in the light guided thereto by second optical element 15. While the object is within a field of view of second optical element 15, second visual information includes the object. First image sensor 16 may include, by way of non-limiting example, one or more of charge-coupled device sensor, active pixel sensor, complementary metal-oxide semiconductor sensor, N-type metal-oxide-semiconductor sensor, and/or other image sensor. Second image sensor 17 may include, by way of non-limiting example, one or more of charge-coupled device sensor, active pixel sensor, complementary metal-oxide semiconductor sensor, N-type metal-oxide-semiconductor sensor, and/or other image sensor.

The first visual information may include, by way of non-limiting example, one or more of an image, a video, and/or other visual information. The second visual information may include, by way of non-limiting example, one or more of an image, a video, and/or other visual information. One or more of the first visual information and/or the second visual information may be marked, timestamped, annotated, stored, and/or otherwise processed.

In some implementations, one or more of first optical element 14, second optical element 15, first image sensor 16 and/or second image sensor 17 may be attached directly to housing 11. By way of non-limiting example, one or more of first optical element 14, second optical element 15, first image sensor 16 and/or second image sensor 17 may be in physical contact with housing 11 and may be directly attached to housing 11, directly supported by housing 11, directly held by housing 11, and/or directly carried by housing 11.

In some implementations, one or more of first optical element 14, second optical element 15, first image sensor 16 and/or second image sensor 17 may be attached indirectly to housing 11. By way of non-limiting example, one or more of first optical element 14, second optical element 15, first image sensor 16 and/or second image sensor 17 may not be in physical contact with housing 11 and may be indirectly attached to housing 11, indirectly supported by housing 11, indirectly held by housing 11, and/or indirectly carried by housing 11. For example, one or more of first optical element 14, second optical element 15, first image sensor 16 and/or second image sensor 17 may be located in a container, and the container may be directly attached to housing 11.

First optical element 14 and second optical element 15 may be arranged to be separated by both a horizontal distance and a vertical distance when housing 11 is being suspended by rotation of rotor 13, and while UAV 10 operates leveled with respect to ground. In some implementations, UAV 10 may be climbing vertically without horizontal movement when UAV 10 operates leveled with respect to ground. In some implementations, UAV 10 may be descending vertically without horizontal movement when UAV 10 operates leveled with respect to ground. In some implementations, UAV 10 may not be tilting sideways when UAV 10 operates leveled with respect to ground. This arrangement of first optical element 14 and second optical element 15 may allow for parallax disparity detection offset from horizontal.

Parallax refers to the seeming change in position of an object because of a change in the observer's viewpoint. Parallax disparity is the change in position of an object between two viewpoints. Parallax disparity is inversely proportional to the distance from the viewpoints to the object. Detecting parallax disparity may be less effective when edges of an object has the same orientation as the optical elements. For example, if the optical elements are horizontally arranged, it may be difficult to determine parallax disparity of horizontal edges of an object. Parallax disparity detection offset from horizontal may allow for detection of more meaningful parallax disparity on horizontal edges.

Figure 2:
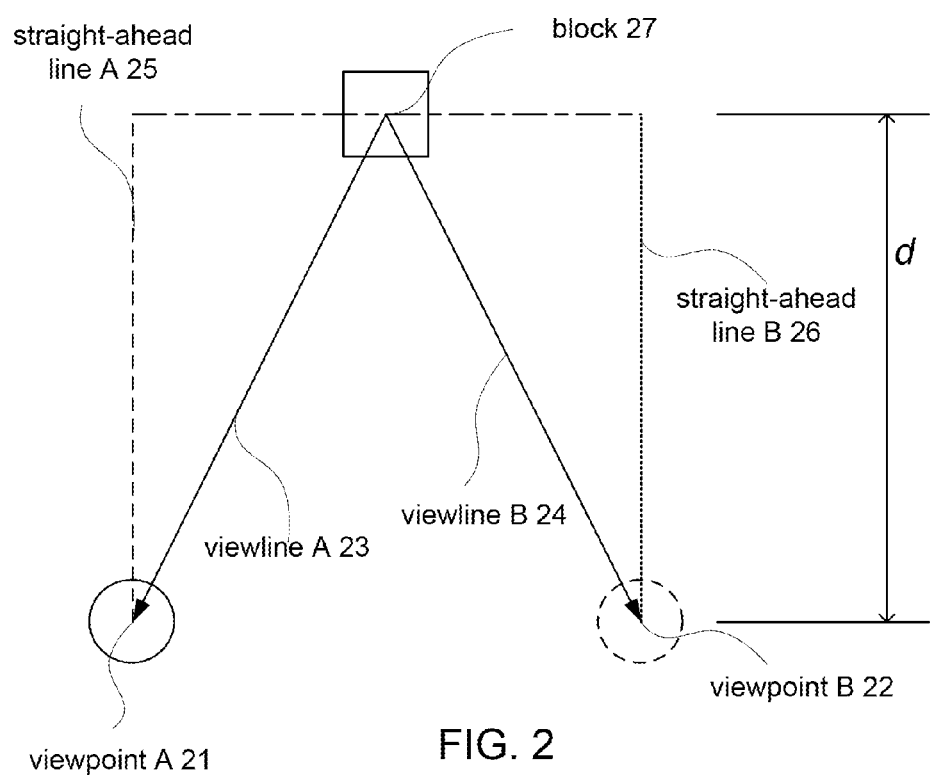
FIG. 2 illustrates two viewpoints of a block.
Figure 3A:
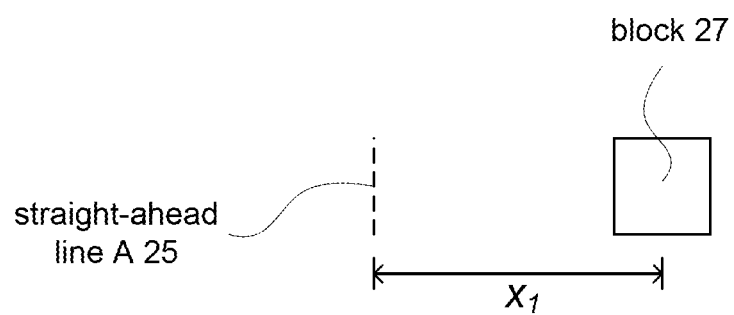
FIG. 3A illustrates parallax of a box due to perspective shift to the left.
Figure 3B:
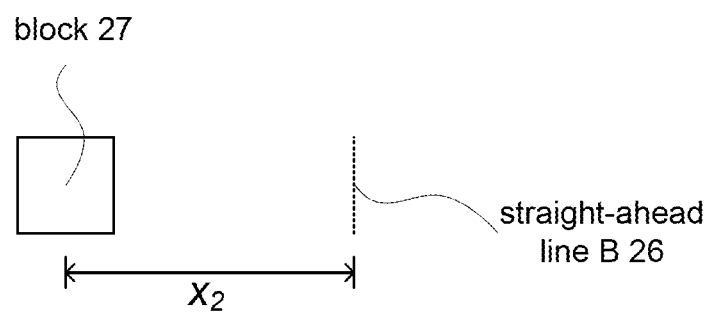
FIG. 3B illustrates parallax of a box due to perspective shift to the right.

A simple case of parallax is illustrated in FIGS. 2, 3A, and 3B. FIG. 2 illustrates two different viewpoints for block 27: viewpoint A 21, and viewpoint B 22. From viewpoint A 21, an observer looking straight ahead would see along straight-ahead line A 25. From viewpoint A 21, the observer sees block 27 along viewline A 23. From viewpoint B 22, an observer looking straight ahead would see along straight-ahead line B 26. From viewpoint B 22, the observer sees block 27 along viewline B 24.

FIG. 3A illustrates parallax of box 27 due to perspective shift to the left, as seen from viewpoint A 21. From viewpoint A 21, the observer sees block 27 to be located at a distance $x_1$ to the right relative to straight-ahead line A 25. FIG. 3B illustrates parallax of box 27 due to perspective shift to the right, as seen from viewpoint B 22. From viewpoint B 22, the observer sees block 27 to be located at a distance $x_2$ to the left relative to straight-ahead line B 26. Parallax disparity of box 27 between viewpoint A 21 and viewpoint B 22 is $x_1+x_2$. Thus, distance from viewpoint A 21 and viewpoint B 22 to block 27, indicated as d in FIG. 2, is inversely proportional to $x_1+x_2$.

If the focal length of first optical element 14 and first image sensor 16, and the focal length of second optical element 15 and second image sensor 17 are identical, then distance D from first optical element 14 and second optical element 15 to an object is determined by the following equation:

$$D = \frac{bf}{x_1 + x_2},$$

where f=focal length, and b=distance between first optical element 14 and second optical element 15

Processor 18 may include one or more of a digital processor, an analog processor, a digital circuit designed to process information, a central processing unit, a graphics processing unit, a microcontroller, an analog circuit designed to process information, and/or other mechanisms for electronically processing information. In some implementations, processor 18 may include a plurality of processing units. In some implementations, processor 18 may be coupled with one or more of RAM, ROM, input/output ports, and/or other peripherals. By way of non-limiting example, a microcontroller may be one or more of 8051, PIC, AVR, and ARM microcontroller.

Processor 18 may be coupled, directly or indirectly, to one or more flight control components. By way of non-limiting example, a flight control component may include one or more of an actuator, a motor, a rotor, an accelerometer, a rate of rotation sensor (e.g., a gyroscope), an inertial measurement unit, a compass, a magnetometer, a pressure sensor, a barometer, a global positioning system device, a distance sensor, an image sensor, an optical element, an electronic storage, and/or other flight control components.

Processor 18 may be configured by a computer-readable instruction to provide information-processing capability. Information-processing capability includes, but is not limited to, receiving the first output signal generated by first image sensor 16, receiving the second output signal generated by second image sensor 17, comparing the first visual information with the second visual information to determine parallax disparity of the object, and/or determining distance between the object and UAV 10 based on the parallax disparity. Comparing the first visual information with the second visual information to determine parallax disparity of the object may include one or more of distortion removal, image rectification, disparity map generation, and/or height map generation.

Different approaches may be utilized to triangulate a pixel corresponding between first visual information and second visual information. For example, different approaches may be utilized based on what is known about first optical element 14, second optical element 15, first image sensor 16, and/or second image sensor 17.

In some implementations, a calibrated projection model, a calibrated distortion model, and relative positions and orientations of first optical element 14, second optical element 15, first image sensor 16, and second image sensor 17 may be known. Using these knowns, rectification and undistortion mapping may be applied to first visual information and second visual information. The first visual information and the second visual information may then be processed by one or more depth estimation algorithm, such as block matching, semi-global block matching, efficient large-scale stereo matching, and/or other depth estimation algorithms, and the depth of pixels may be determined. Alternative to applying rectification and/or undistortion mapping, a pixel location may be triangulated by using the locations of the pixel in the first visual information and the second visual information, and the calibration models of first optical element 14, second optical element 15, first image sensor 16, and second image sensor 17.

In some implementations, a calibrated projection model and a calibrated distortion model of first optical element 14, second optical element 15, first image sensor 16, and second image sensor 17 may be known. Relative positions and orientations of first optical element 14, second optical element 15, first image sensor 16, and second image sensor 17 may be estimated by using a set of point correspondences between the first visual information and the second visual information. In parallel to the above estimation, the positions of pixels relative to the positions of first optical element 14, second optical element 15, first image sensor 16, and second image sensor 17 may be estimated. Such estimations may include simultaneous localization and mapping (SLAM).

In some implementations, no calibration regarding first optical element 14, second optical element 15, first image sensor 16, and second image sensor 17 may be known. Positions, orientations, and intrinsic parameters of first optical element 14, second optical element 15, first image sensor 16, and second image sensor 17 may be estimated using software frameworks for three-dimensional photogrammetric reconstruction.

In some implementations, one or more of the above approaches may be utilized to triangulate a pixel corresponding between first visual information and second visual information. Other approaches are contemplated.

In some implementations, the computer-readable instruction may be stored in memory of processor 18. In some implementations, the computer-readable instruction may be stored in electronic storage 19. In some implementations, the computer-readable instruction may be received through remote communication, including, but not limited to, radio communication, Bluetooth communication, Wi-Fi communication, cellular communication, infrared communication, or other remote communication. In some implementations, processor 18 may use computer-readable instruction from one or more of memory of processor 18, electronic storage 19, and/or remote communication.

In some implementations, processor 18 may include a flight control instruction in its memory to provide flight control. In some implementations, a flight control instruction may be stored in electronic storage 19. In some implementations, a flight control instruction may be received through remote communication, including, but not limited to, radio communication, Bluetooth communication, Wi-Fi communication, cellular communication, infrared communication, and/or other remote communication. By way of non-limiting example, a flight control instruction include one or more of moving UAV 10 in any direction, rotating UAV 10 in any direction, flying UAV 10 in a stable manner, tracking people or objects, avoiding collisions, and/or other functions needed and/or used during operation of unmanned aerial vehicles. By way of non-limiting example, flight control may include one or more of stabilization control, navigation control, altitude control, attitude control, position control, propulsion control, engine control, and/or other control needed and/or used during operation of unmanned aerial vehicles.

In some implementations, a flight control instruction may be stored in electronic storage 19. In some implementations, a flight control instruction may be received through remote communication, including, but not limited to, radio communication, Bluetooth communication, Wi-Fi communication, cellular communication, infrared communication, or other remote communication. In some implementations, processor 18 may use flight control instruction from one or more of memory of processor 18, electronic storage 19, and/or remote communication.

Electronic storage 19 may include electronic storage media that electronically stores information. The electronic storage media of electronic storage 19 may be provided integrally (i.e., substantially non-removable) with UAV 10 and/or removable storage that is connectable to UAV 10 via, for example, a port (e.g., a USB port, a Firewire port, etc.) or a drive (e.g., a disk drive, etc.). Electronic storage 19 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 19 may store software algorithms, information determined by processor 18, information received remotely, and/or other information that enables UAV 10 to function properly. For example, electronic storage 19 may store captured visual information (as discussed elsewhere herein), and/or other information. Electronic storage 19 may be a separate component within UAV 10, or electronic storage 19 may be provided integrally with one or more other components of UAV 10 (e.g., processor 18).

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. An unmanned aerial vehicle comprising:
   a housing;
   a motor carried by the housing, the motor being configured to drive a rotor;
   a first optical element configured to guide light to a first image sensor, the first optical element having a first field of view;
   the first image sensor configured to generate a first output signal conveying first visual information based on the light guided to the first image sensor by the first optical element, the first visual information including an object while the object is within the first field of view;
   a second optical element configured to guide light to a second image sensor, the second optical element having a second field of view;
   the second image sensor configured to generate a second output signal conveying second visual information based on the light guided to the second image sensor by the second optical element, the second visual information including the object while the object is within the second field of view;
   wherein the first optical element, the second optical element, the first image sensor and the second image sensor are attached to the housing;
   further wherein the first optical element and the second optical element are arranged to be separated by a horizontal distance when the unmanned aerial vehicle operates leveled with respect to ground; and
   further wherein the first optical element and the second optical element are arranged to be separated by a vertical distance when the unmanned aerial vehicle operates leveled with respect to ground such that the second optical element is above the first optical element; and
   a processor attached to the housing, wherein the processor is configured by machine-readable instructions to:
   provide flight control for the unmanned aerial vehicle;
   receive the first output signal and the second output signal; and
   compare the first visual information with the second visual information to determine a disparity of the object.

2. The unmanned aerial vehicle of claim 1, wherein the processor is further configured to determine distance between the unmanned aerial vehicle and the object based on the disparity of the object.

3. The unmanned aerial vehicle of claim 1, wherein the first image sensor includes one or more of a charge-coupled device sensor, an active pixel sensor, a complementary metal-oxide semiconductor sensor and/or an N-type metal-oxide-semiconductor sensor.

4. The unmanned aerial vehicle of claim 1, wherein the second image sensor includes one or more of a charge-coupled device sensor, an active pixel sensor, a complementary metal-oxide semiconductor sensor and/or an N-type metal-oxide-semiconductor sensor.

5. The unmanned aerial vehicle of claim 1, wherein the first optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

6. The unmanned aerial vehicle of claim 1, wherein the second optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

7. The unmanned aerial vehicle of claim 1, wherein the unmanned aerial vehicle is climbing vertically without horizontal movement when the unmanned aerial vehicle operates leveled with respect to ground.

8. The unmanned aerial vehicle of claim 1, wherein the unmanned aerial vehicle is descending vertically without horizontal movement when the unmanned aerial vehicle operates leveled with respect to ground.

9. The unmanned aerial vehicle of claim 1, wherein the unmanned aerial vehicle is not tilting sideways when the unmanned aerial vehicle operates leveled with respect to ground.

10. The unmanned aerial vehicle of claim 1, wherein the rotor is not producing horizontal thrust when the unmanned aerial vehicle operates leveled with respect to ground.

11. A method for parallax disparity detection offset from horizontal, the method comprising:
  generating, by a first image sensor, a first output signal conveying first visual information based on light guided to the first image sensor by a first optical element, the first visual information including an object while the object is within a first field of view of the first optical element, the first optical element configured to guide the light to the first image sensor;
  generating, by a second image sensor, a second output signal conveying second visual information based on light guided to the second image sensor by a second optical element, the first second information including the object while the object is within a second field of view of the second optical element, the second optical element configured to guide the light to the second image sensor;
    wherein the first optical element, the second optical element, the first image sensor and the second image sensor are attached to a housing of an unmanned aerial vehicle;
    further wherein the first optical element and the second optical element are arranged to be separated by a horizontal distance when the unmanned aerial vehicle operates leveled with respect to ground; and
    further wherein the first optical element and the second optical element are arranged to be separated by a vertical distance when the unmanned aerial vehicle operates leveled with respect to ground such that the second optical element is above the first optical element; and
  receiving the first output signal and the second output signal; and
  comparing the first visual information with the second visual information to determine a disparity of the object.

12. The method of claim 11, further comprising determining distance between the unmanned aerial vehicle and the object based on the disparity of the object.

13. The method of claim 11, wherein the first image sensor includes one or more of a charge-coupled device sensor, an active pixel sensor, a complementary metal-oxide semiconductor sensor and/or an N-type metal-oxide-semiconductor sensor.

14. The method of claim 11, wherein the second image sensor includes one or more of a charge-coupled device sensor, an active pixel sensor, a complementary metal-oxide semiconductor sensor and/or an N-type metal-oxide-semiconductor sensor.

15. The method of claim 11, wherein the first optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

16. The method of claim 11, wherein the second optical element includes one or more of a standard lens, a macro lens, a zoom lens, a special-purpose lens, a telephoto lens, a prime lens, an achromatic lens, an apochromatic lens, a process lens, a wide-angle lens, an ultra-wide-angle lens, a fisheye lens, an infrared lens, an ultraviolet lens and/or a perspective control lens.

17. The method of claim 11, wherein the unmanned aerial vehicle is climbing vertically without horizontal movement when the unmanned aerial vehicle operates leveled with respect to ground.

18. The method of claim 11, wherein the unmanned aerial vehicle is descending vertically without horizontal movement when the unmanned aerial vehicle operates leveled with respect to ground.

19. The method of claim 11, wherein the unmanned aerial vehicle is not tilting sideways when the unmanned aerial vehicle operates leveled with respect to ground.

20. An unmanned aerial vehicle comprising:
  a housing;
  a motor carried by the housing, the motor being configured to drive a rotor;
  a first optical element configured to guide light to a first image sensor, the first optical element having a first field of view;
  the first image sensor configured to generate a first output signal conveying first visual information based on the light guided to the first image sensor by the first optical element, the first visual information including an object while the object is within the first field of view;
  a second optical element configured to guide light to a second image sensor, the second optical element having a second field of view;
  the second image sensor configured to generate a second output signal conveying second visual information based on the light guided to the second image sensor by the second optical element, the second visual information including the object while the object is within the second field of view;

wherein the first optical element, the second optical element, the first image sensor and the second image sensor are attached to the housing;

further wherein the first optical element and the second optical element are arranged to be separated by a horizontal distance when the unmanned aerial vehicle operates leveled with respect to ground; and further wherein the first optical element and the second optical element are arranged to be separated by a vertical distance when the unmanned aerial vehicle operates leveled with respect to ground such that the second optical element is above the first optical element; and a processor attached to the housing, wherein the processor is configured by machine-readable instructions to:

provide flight control for the unmanned aerial vehicle;

receive the first output signal and the second output signal;

compare the first visual information with the second visual information to determine a disparity of the object; and determine distance between the unmanned aerial vehicle and the object based on the disparity of the object.

* * * * *